(12) United States Patent
Schijvenaars et al.

(10) Patent No.: US 10,127,229 B2
(45) Date of Patent: Nov. 13, 2018

(54) METHODS AND COMPUTER-PROGRAM PRODUCTS FOR ORGANIZING ELECTRONIC DOCUMENTS

(71) Applicant: Elsevier B.V., Amsterdam (NL)

(72) Inventors: Bob Schijvenaars, Zoeterwoude (NL); Marius Doornenbal, Meteren (NL)

(73) Assignee: Elsevier B.V., Amsterdam (NL)

( * ) Notice: Subject to any disclaimer, the term of this patent is extended or adjusted under 35 U.S.C. 154(b) by 976 days.

(21) Appl. No.: 14/259,671

(22) Filed: Apr. 23, 2014

(65) Prior Publication Data

US 2015/0310000 A1    Oct. 29, 2015

(51) Int. Cl.
*G06F 17/30* (2006.01)

(52) U.S. Cl.
CPC .... *G06F 17/30011* (2013.01); *G06F 17/3071* (2013.01); *G06F 17/30707* (2013.01); *G06F 17/30728* (2013.01)

(58) Field of Classification Search
CPC ......... G06F 17/30011; G06F 17/30707; G06F 17/30728
See application file for complete search history.

(56) References Cited

U.S. PATENT DOCUMENTS

| | | | |
|---|---|---|---|
| 6,457,028 B1 | 9/2002 | Pitkow et al. | |
| 7,194,471 B1 | 3/2007 | Nagatsuka et al. | |
| 7,971,150 B2 | 6/2011 | Raskutti et al. | |
| 8,015,188 B2 | 9/2011 | Gallivan et al. | |
| 8,046,363 B2 | 10/2011 | Cha et al. | |
| 8,380,718 B2 | 2/2013 | Gallivan et al. | |
| 2010/0104200 A1* | 4/2010 | Baras | G06F 17/30648 382/209 |
| 2011/0060738 A1* | 3/2011 | Gates | G06F 17/30749 707/737 |

(Continued)

OTHER PUBLICATIONS

Partial International Search Report of PCT/IB2015/001596, dated Apr. 22, 2015.

(Continued)

*Primary Examiner* — Uyen T Le
(74) *Attorney, Agent, or Firm* — Dinsmore & Shohl, LLP

(57) ABSTRACT

Methods of organizing documents by reclassification and clustering are disclosed. In one embodiment, a method of clustering electronic documents of a document corpus includes comparing, by a computer, each individual electronic document in the document corpus with each other electronic document in the document corpus, thereby forming document pairs. The electronic documents of the document pairs are compared by calculating a similarity value with respect to the electronic documents of a document pair, associating the similarity value with both electronic documents of the document pair, and applying a clustering algorithm to the document corpus using the similarity values to create a plurality of hierarchical clusters. The similarity value is based on a plurality of attributes of the electronic documents in the document corpus. The plurality of attributes includes a citation attribute, a text-based attribute and one or more of an author-attribute, a publication-attribute, an institution-attribute, a downloads-attribute, and a clustering-results-attribute.

16 Claims, 6 Drawing Sheets

(56) References Cited

U.S. PATENT DOCUMENTS

| | | | | |
|---|---|---|---|---|
| 2011/0264672 | A1* | 10/2011 | Gipp | G06F 17/30728 707/749 |
| 2012/0284269 | A1* | 11/2012 | Parunak | G06F 17/30705 707/737 |
| 2013/0006979 | A1* | 1/2013 | Bonanni | G06F 17/30705 707/731 |
| 2013/0006991 | A1* | 1/2013 | Nagano | G06F 17/3002 707/737 |
| 2014/0032557 | A1* | 1/2014 | Bayliss | G06F 17/30303 707/737 |

OTHER PUBLICATIONS

Weiss R. et al.; "Hypursuit: A Hierarchical Network Search Engine that Exploits Content-Link Hypertext Clustering", ACM, Vol. Conf. Mar. 7, 1996, pp. 180-193.

Working Party of National Experts on Science and Technology Indicators, Directorate for Science, Technology and Industry, Committee for Scientific and Technological Policy, Feb. 26, 2007.

Yoon, Byungun and Park, Yongtae, A text-mining-based patent network: Analytical tool for high-technology trend, Journal of High Technology, Management Research 15 (2004) 37-50, Sep. 22, 2003.

Waltman, Ludo and Jan van Eck, Nees, A New Methodology for Constructing a Publication-Level Classification System of Science, Journal of the American Society for Information Science and Technology, 63(12):2378-2392, 2012.

Aljaber, Bader et al., Document clustering of scientific texts using citation contexts, Springer Science+Business Media, LLC, Aug. 15, 2009.

Bergmark, Donna, Automatic Extraction of Reference Linking Information from Online Documents, Cornell Digital Library Research Group, CSTR 2000-1821, Apr. 9, 2007.

Jahnavi, Y. and Radhika, Y., A Cogitate Study on Text Mining, International Journal of Engineering and Advanced Technology, ISSN: 2249-8958, vol. 1, Issue-6, Aug. 2012.

* cited by examiner

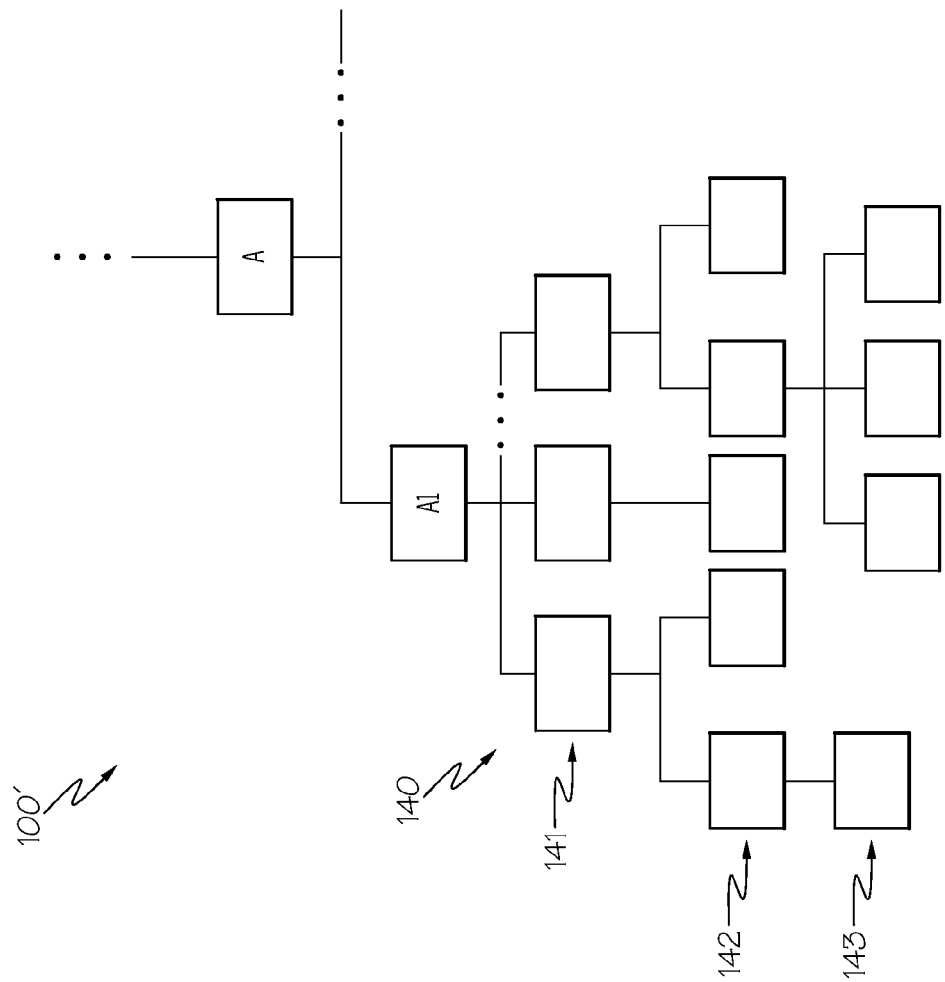

METHODS AND COMPUTER-PROGRAM PRODUCTS FOR ORGANIZING ELECTRONIC DOCUMENTS

BACKGROUND

Field

The present specification generally relates to electronic documents and, more specifically, to methods of organizing electronic documents by reclassifying and clustering documents using a similarity value indicating a similarity between documents of document pairs.

Technical Background

Electronic documents of a document corpus are often classified according to a classification system. For example, journal articles may be classified according to the All Science Journal Codes or the Field of Science and Technology classification systems, both of which have a plurality of hierarchical classification codes associated therewith. Journal articles are often classified according to the journal in which it has been published. However, in many cases, journal articles (or other types of documents) are misclassified because the journal article may actually be more relevant to articles associated with a classification code other than classification code associated with the journal. Additionally, journals having a broad focus may have a broad classification code associated therewith; however, individual articles within the journal often have a narrower focus and could be classified more accurately. Misclassification of documents in the classification system may cause problems for researchers. For example, the misclassification of documents may prevent a researcher from finding documents relevant to his or her search.

Further, classification systems may not provide sufficient granularity to be beneficial to a researcher. For example, there may be a large number of sub-groups of related documents below the lowest level of the classification system. These sub-groups are not represented by the classification system, particularly in classification systems only two or three levels deep. Additionally, manual creation and management of multiple sub-levels in a hierarchical classification system may be too burdensome.

Accordingly, a need exists for alternative methods of reclassifying and clustering documents in a classification system to provide for additional levels of the classification system.

SUMMARY

In one embodiment, a method of clustering electronic documents of a document corpus includes comparing, by a computer, each individual electronic document in the document corpus with each other electronic document in the document corpus, thereby forming document pairs. The electronic documents of the document pairs are compared by calculating a similarity value with respect to the electronic documents of the document pair, associating the similarity value with both electronic documents of the document pair, and applying a clustering algorithm to the document corpus using the similarity values to create a plurality of hierarchical clusters. The similarity value is based on a plurality of attributes of the electronic documents in the document corpus, wherein the plurality of attributes includes a citation attribute, a text-based attribute and one or more of the following attributes: an author attribute, a publication attribute, an institution attribute, a downloads attribute, and a clustering results attribute.

In another embodiment, a method of organizing electronic documents of a document corpus includes applying a classifier to the documents. Each electronic document has a predetermined classification code and similarity values based on a similarity with respect to other electronic documents in the document corpus. More specifically, the method includes, for one or more predetermined classification codes, applying a classifier to each electronic document having the predetermined classification code to associate an evaluation code with each electronic document, wherein the classifier uses the similarity values of the electronic documents having the predetermined classification code. The method further includes, for one or more predetermined classification codes, after determining an evaluation classification for each electronic document in the document corpus, applying a clustering algorithm to electronic documents having an evaluation code that is the same as the predetermined classification code to create a plurality of hierarchical clusters under the predetermined classification code, wherein the clustering algorithm uses the similarity values of the electronic documents in the document corpus.

In yet another embodiment, a computer-program product for clustering electronic documents of a document corpus includes a computer-readable medium storing executable instructions that, when executed by a computing device, causes the computing device to compare each individual electronic document in the document corpus with each other electronic document in the document corpus, thereby forming document pairs. The electronic documents of the document pairs are compared by calculating a similarity value with respect to the electronic documents of a document pair, and associating the similarity value with both electronic documents of the document pair. The similarity value is based on a plurality of attributes of the electronic documents in the document corpus, wherein the plurality of attributes includes a citation attribute, a text-based attribute and one or more of the following attributes: an author attribute, a publication attribute, an institution attribute, a downloads attribute, and a clustering results attribute. The executable instructions further cause the computing device to apply a clustering algorithm to the document corpus using the similarity values to create a plurality of hierarchical clusters.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIG. 7 depicts a graphical representation of a portion of a classification system having a plurality of unsupervised, hierarchical clusters according to one or more embodiments shown and described herein.

DETAILED DESCRIPTION

Figure 1:
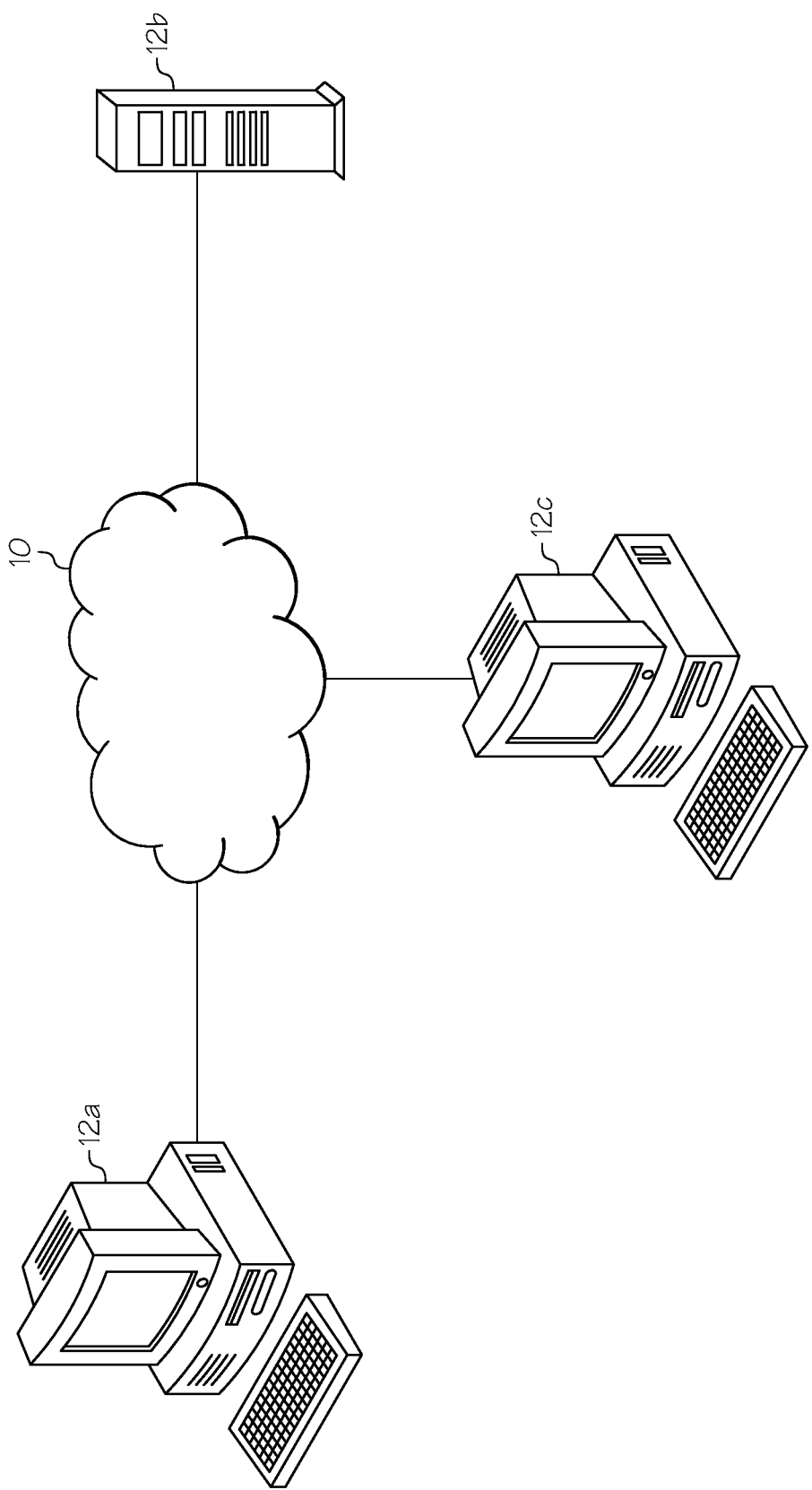
FIG. 1 depicts a schematic illustration of a computing network for performing the functionality described herein according to one or more embodiments shown and described herein.

Referring generally to the figures, embodiments described herein are directed to methods and computer-program products for reclassifying electronic documents organized in a classification system, and for forming hierarchical document clusters under the various classification codes of the classification system. By properly classifying documents and forming hierarchical clusters by subject matter, users may more easily find documents relevant to a subject matter of interest, and it also enables comparison of derived entities (authors, institutions, or even countries) within clusters so that systematic differences (e.g., in publication style) between clusters can be taken into account. For instance, the number of authors in physics is systematically higher than in social sciences. Furthermore, clustering enables trending analysis within categories and allows for strength/weakness analyses.

In many cases, documents of a document corpus are classified in accordance with a classification system. Exemplary classification systems include, but are not limited to, All Science Journal Codes ("ASJC"), Field of Science and Technology ("FOS"), and the United States Patent and Trademark Office classification system. It should be understood that these are just examples, and that many classification systems are utilized throughout the world.

Classification systems are often hierarchically arranged by subject matter (see FIG. 3, described below). For example, the top-level of the FOS classification system includes classification codes directed to Natural sciences, Engineering and technology, Medical and Health sciences, and the like. Under each top-level classification code there are several sub-codes. For example, sub-codes such as Mathematics, Computer and information sciences, Physical sciences, Chemical sciences, and Earth and related Environmental sciences appear underneath the top-level Natural sciences classification code in the FOS classification system. The number of levels depends on the particular classification system.

Electronic documents (e.g., journal articles) are assigned one or more classification codes based on their subject matter. It is noted that some multidisciplinary journals often have multiple classification codes associated therewith. As an example and not a limitation, journal articles appearing in a journal relating to computer science may be assigned a classification code corresponding to computer science. However, some journals (or other publications) may be directed to multiple disciplines (i.e., subject matter topics) or include journal articles that are more relevant to another classification code rather than the classification code associated with the journal that the journal article is published in. Such documents may be considered misclassified, which may cause the documents to be hidden from a researcher. As an example and not a limitation, a journal article discussing magnetic resonance imaging may be published in a journal that is classified under a Medical Health Sciences classification code. However, the journal article may be more properly classified under an Engineering and Technology classification code based on the subject matter of the journal article. The journal article may maintain its original classification code (e.g., Medical Health Sciences) in addition to the new classification code (e.g., Engineering and Technology) in some embodiments.

Embodiments of the present disclosure use documents of a document corpus and their predetermined classification codes as a training set to evaluate each document to determine whether or not the documents should be reclassified under a classification code that is different from the predetermined classification code that was assigned to it. More specifically, embodiments apply a classifier to each document to determine an evaluation classification code. If the evaluation classification code is different from the document's predetermined classification code, the document is then reclassified under the evaluation classification code, or the evaluation classification code is assigned in addition to the predetermined classification code.

Embodiments of the present disclosure may also group similarly related documents into clusters under one or more classification codes. Documents may be clustered in a hierarchical manner under a classification code that is a leaf node in the hierarchical, tree structure. As an example and not a limitation, documents assigned to the Clinical Neurology classification code (i.e., documents having the Clinical Neurology classification code either as a predetermined classification code or as an evaluation classification code following the reclassification process) may be clustered into hierarchical clusters of related documents under the leaf node Clinical Neurology classification code. In some embodiments, the documents of each lowest-level classification code (i.e., leaf nodes) are organized into hierarchical clusters. Organizing the documents into hierarchical clusters may make it easier for a researcher to find the documents that he or she is looking for, as well as allows for aggregating documents and visualizing of trends based on the clusters.

Various embodiments of methods, systems, and computer-program products for organizing and clustering electronic documents of a document corpus are described in detail below.

Referring now to the drawings, FIG. 1 depicts an exemplary computing network, illustrating components for a system for organizing documents (i.e., electronic documents), as well as searching a document corpus for documents relevant to a particular subject of interest, according to embodiments shown and described herein. As illustrated in FIG. 1, a computer network 10 may include a wide area network, such as the Internet, a local area network (LAN), a mobile communications network, a public service telephone network (PSTN) and/or other network and may be configured to electronically connect a user computing device 12a, a server computing device 12b, and an administrator computing device 12c.

The user computing device 12a may be used to input one or more documents into an electronic document corpus as well as perform searching of the document corpus. The user computing device 12a may also be utilized to perform other user functions. Additionally, included in FIG. 1 is the administrator computing device 12c. In the event that the server computing device 12b requires oversight, updating, or correction, the administrator computing device 12c may be configured to provide the desired oversight, updating, and/or correction. The administrator computing device 12c, as well as any other computing device coupled to the network 10, may be used to input one or more documents into the electronic document corpus.

It should be understood that while the user computing device 12a and the administrator computing device 12c are depicted as personal computers and the server computing device 12b is depicted as a server, these are non-limiting examples. More specifically, in some embodiments any type of computing device (e.g., mobile computing device, personal computer, server, etc.) may be utilized for any of these components. Additionally, while each of these computing devices is illustrated in FIG. 1 as a single piece of hardware, this is also merely an example. More specifically, each of the user computing device 12a, server computing device 12b, and administrator computing device 12c may represent a plurality of computers, servers, databases, etc.

Figure 2:
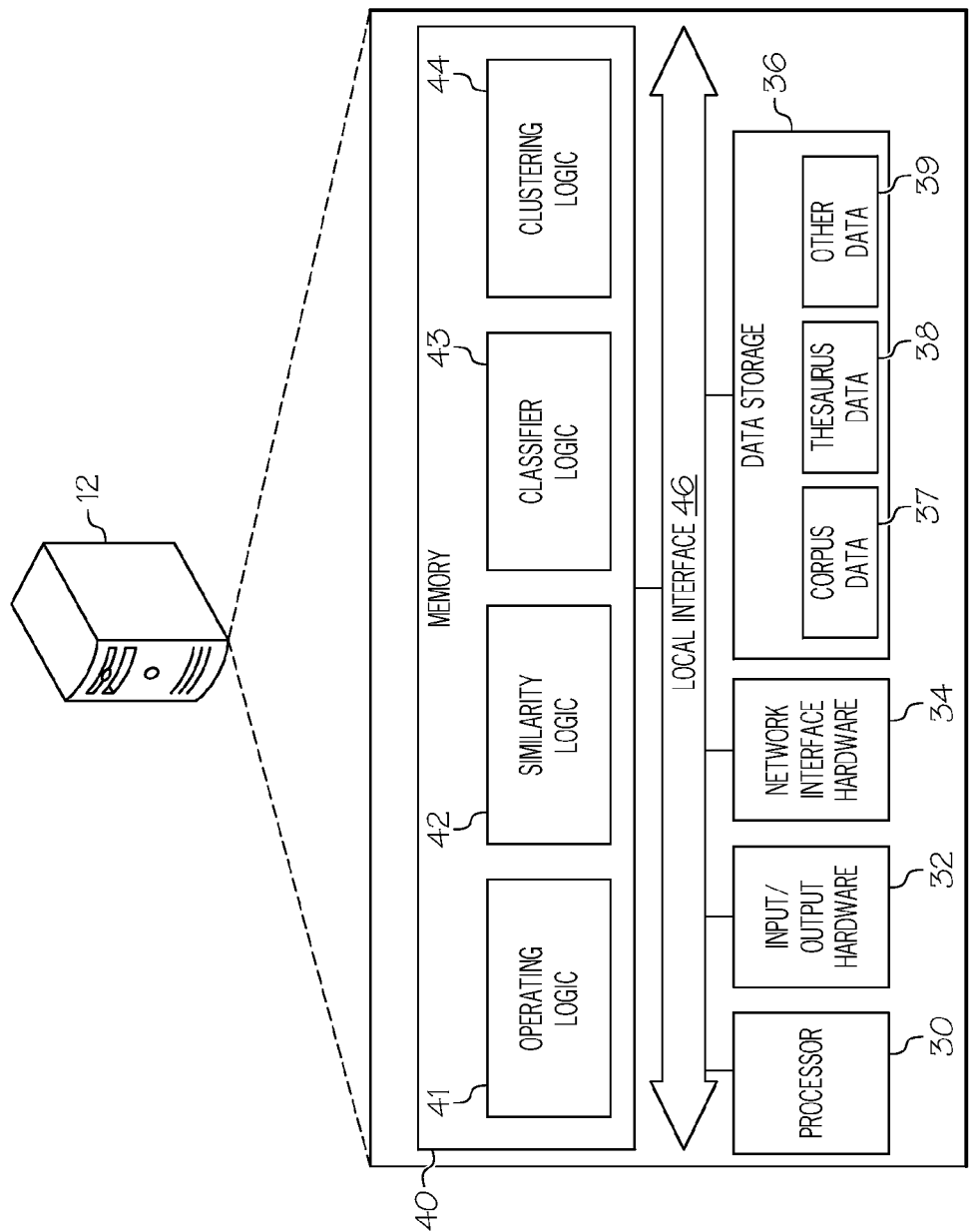
FIG. 2 depicts a schematic illustration of a computing device illustrating hardware and software that may be utilized to perform the functionality described herein according to one or more embodiments shown and described herein.

FIG. 2 depicts a computing device 12 illustrating a computer-implemented system for organizing documents by reclassification and clustering, and/or a non-transitory computer-readable medium for organizing documents by reclassification and clustering, software, and/or firmware, according to embodiments shown and described herein. While in some embodiments, the computing device 12 may be configured as a general purpose computer with the requisite hardware, software, and/or firmware, in some embodiments, the computing device 12 may be configured as a special purpose computer designed specifically for performing the functionality described herein. The computing device 12 may be configured as any computing device, such as, but not limited to, a desktop computer, a laptop computer, a tablet computer, and a smart phone. Although FIG. 2 depicts an embodiment wherein the described computer-implemented method is performed by a single computing device, embodiments are not limited thereto. For example, embodiments may be configured as networked computing devices, such that any number of computing devices may be communicatively coupled to perform the methods described herein in a distributed computing manner.

As also illustrated in FIG. 2, the computing device 12 may include a processor 30, input/output hardware 32, network interface hardware 34, a data storage component 36 (which may store corpus data 37, thesaurus data 38, and other data 39), and a non-transitory memory component 40. The memory component 40 may be configured as volatile and/or nonvolatile computer-readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store operating logic 41 and similarity logic 42, classifier logic 43, and clustering logic 44 (each of which may be embodied as a computer-program, firmware, or hardware, as an example). A local interface 46 is also illustrated in FIG. 2 and may be implemented as a bus or other interface to facilitate communication among the components of the computing device 12.

The processor 30 may include any processing component(s) configured to receive and execute instructions (such as from the data storage component 36 and/or memory component 40). The input/output hardware 32 may include a monitor, keyboard, mouse, printer, camera, microphone, speaker, touch-screen, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the computing device 12, and may be configured to store one or more pieces of data for access by the computing device 12 and/or other components. Further, the data storage component 36 and the memory component 40 may be configured as single component. As illustrated in FIG. 2, the data storage component 36 may store corpus data 37, which includes a plurality of electronic documents. The electronic documents may include, but are not limited to, journals, journal articles, news articles, and patent documents. The corpus data 37 may be stored in one or more data storage devices either internal or external to the computing device. In some embodiments, the electronic documents may be configured as marked-up electronic documents that have been annotated by a mark-up language, such as XML, for example.

The thesaurus data 38 includes data associated with one or more thesauri or controlled vocabularies. As described in more detail below, some embodiments may access one or more thesauri when calculating a similarity value. Exemplary thesauri and controlled vocabularies may include, but are not limited to, thesauri based on Compendex, Medical Subject Headings ("MeSH"), National Agricultural Library agricultural thesaurus ("NAL"), as well as custom thesauri or indices.

The thesaurus data 38 may be stored in the data storage component 36 local to the computing device 12, or stored remotely from the computing device 12 (e.g., an external storage device, a networked computer, or a remote server). Other data 39 may be stored in the data storage component 36 and may include a data structure(s) in which the annotations described herein are provided and accessed. The other data 39 may also provide support for functionalities described herein (e.g., metadata that may be utilized in conjunction with the corpus data 38).

Included in the memory component 40 are the operating logic 41 and similarity logic 42, classifier logic 43, and clustering logic 44. The operating logic 41 may include an operating system and/or other software for managing components of the computing device 12. The similarity logic 44 may be configured as computer readable instructions that provide for the calculation of similarity values for each document, where each similarity value represents a similarity between two documents of a document pair. The classifier logic 43 and the clustering logic 44 may be configured as computer readable instructions that provide for functionality described herein, such as reclassification and clustering, respectively.

It should be understood that the components illustrated in FIGS. 1 and 2 are merely exemplary and are not intended to limit the scope of this disclosure. More specifically, while the components in FIG. 2 are illustrated as residing within the computing device 12, this is a non-limiting example. In some embodiments, one or more of the components may reside external to the computing device 12. Similarly, while FIG. 2 is directed to the computing device 12, other components may include similar hardware, software, and/or firmware. The processor 30, memory component 40 and logic stored thereon may define a computer-program product for organizing and clustering documents of a document corpus.

Figure 3:
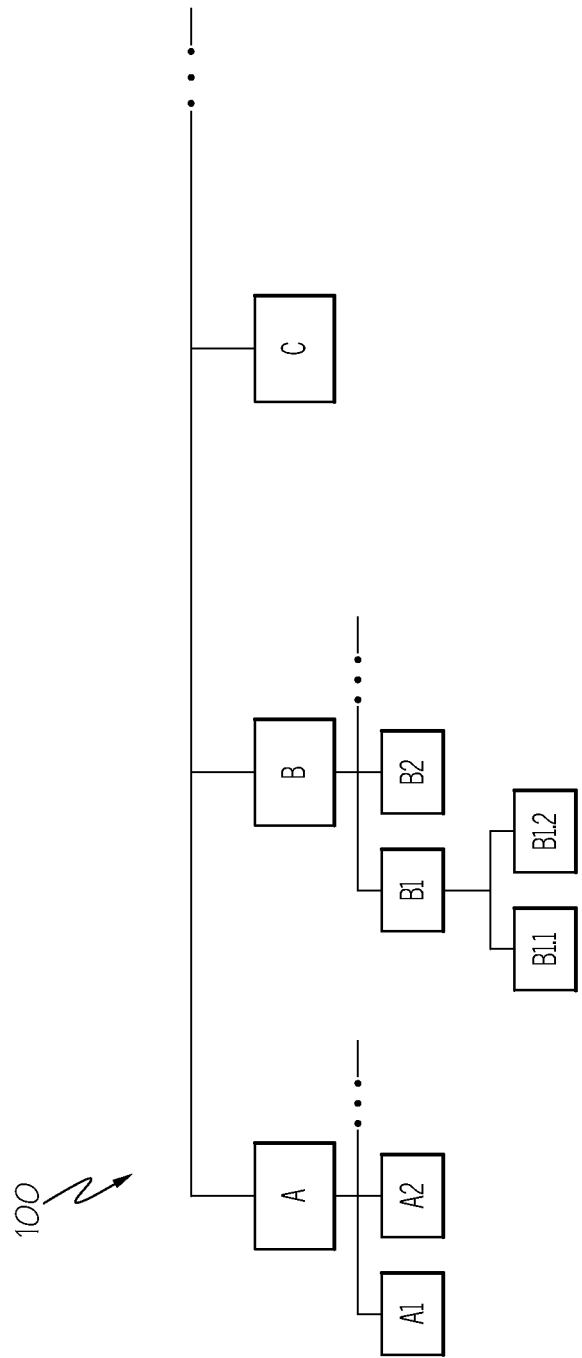
FIG. 3 depicts a graphical representation of a classification system according to one or more embodiments shown and described herein.

Referring now to FIG. 3, an example classification system 100 is graphically illustrated. The example classification system 100 is hierarchically arranged, such that each top-level classification code (e.g., A, B, C, etc.) has one or more sub-classification codes beneath it. For example, classification code A may be for "Engineering and technology," and may have a plurality of sub-classification codes (e.g., A1, A2, etc.) beneath it. The sub-classification codes may be "civil engineering" (A1), "electrical engineering" (A2), and the like. As stated above, documents, such as journal articles, may be assigned a classification code according to certain considerations. In the case of journal articles, for example, a journal article may be assigned a classification code according to the journal in which it is published. It is noted that, due to the hierarchical arrangement of the classification system, a document that is assigned a sub-classification code is automatically a member of the classification codes from which the assigned sub-classification code depends. For example, documents assigned classification code "A2" are automatically members of classification code "A" because classification code "A2" depends from classification code "A." It should be understood that any number of top-level classification codes may be provided, and any number of levels as well as sub-classification codes may be provided. In some embodiments, each classification code has a title and an identification number associated therewith.

In some embodiments, particular classification codes of the classification system 100 are forbidden or otherwise ignored from the processes described herein. For example, any miscellaneous or catch-all classification codes may be ignored when reclassifying and/or clustering documents as described herein.

Figure 4:
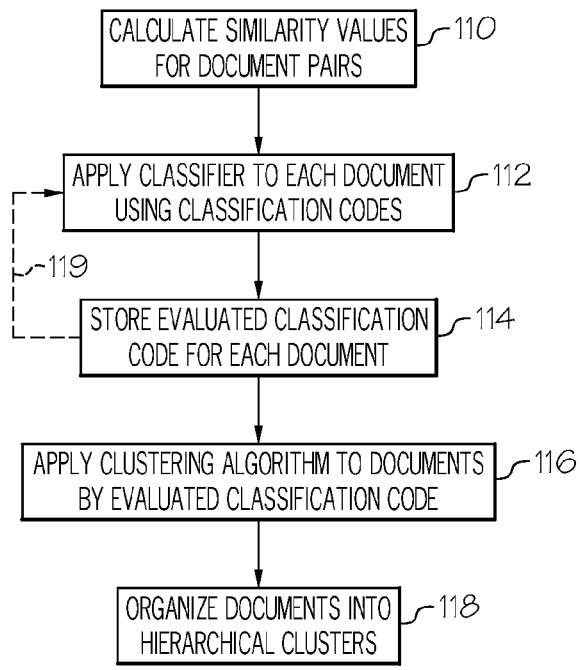
FIG. 4 depicts a flowchart illustrating a process for determining similarity values, reclassifying documents, and clustering documents associated with a classification system according to one or more embodiments shown and described herein.

Referring now to FIG. 4, a flowchart describing a method of determining similarity values, reclassifying documents in a classification system, and organizing documents into clusters is illustrated. The flowchart of FIG. 4 will be first described generally followed by detailed description of the individual process blocks. At block 110, similarity values are calculated for each document. As described in more detail below, each document in the document corpus (or some sub-set of documents in the document corpus) is paired with the other documents in the document corpus to form document pairs. A similarity value is calculated for each document pair. The similarity value represents a degree of similarity between the first document and the second document of the document pair. The similarity value may be utilized for a variety of purposes including, but not limited to, reclassifying documents and organizing documents into clusters.

At block 112, each document is evaluated to determine whether or not it is classified in the proper classification code. As stated above, in some cases, a document may be assigned a predetermined classification code that is not as applicable as another classification code of the classification system. For example, a particular journal article (or other type of document) may be assigned "D5" as the predetermined classification code based on the journal in which it was published. However, the classification code "T3" may be more appropriate based on the actual subject matter of the particular journal article as indicated by the similarity values determined at block 110. In the embodiments described herein, the journal article may be reclassified under "T3" rather than the original, predetermined classification code of "D5.", or may be given "T3" in addition to the existing code "D5." Documents wherein the predetermined classification code is deemed appropriate will keep their classification codes.

An evaluation classification code is a classification code that is determined in block 112. The evaluation classification codes are stored or otherwise associated with each document (or a sub-set of documents in the document corpus) at block 114. In this manner, documents may be classified into more appropriate classification codes or assigned additional codes.

In some embodiments, the process returns to block 112 from block 114 (illustrated by arrow 119) to reclassify documents using the newly assigned evaluation code or codes instead of, or in addition to, the original predetermined classification codes.

At blocks 116 and 118, the documents within the lowest-level classification codes (i.e., a leaf nodes that do not have any child classification codes) are organized into hierarchical clusters based at least in part on the similarity values calculated at block 110. More specifically, a clustering algorithm is applied to the documents within one or more lower-level classification codes to identify groups (i.e., clusters) of related documents at block 116. These groups may be hierarchically arranged (see FIG. 7, described in detail below) such that documents in lower-level clusters are also included in higher-level clusters from which the lower-level clusters stem. In other embodiments, only the documents in the sub-classification codes (see FIG. 3, e.g., A1, A2, A3, etc.) are organized into clusters. At block 118, the documents are organized into the hierarchical clusters (e.g., by saving metadata with respect to the document and the cluster(s) to which it has been assigned).

Methods of calculating the similarity values in block 110 will now be described. As stated above, the similarity value is a numerical representation of how similar two documents of a document pair are to one another. Each document is paired with the other documents in the document corpus. The documents of the document pairs are then compared to determine how similar they are to one another. Generally, embodiments of the present disclosure utilize a plurality of attributes in determining the similarity between documents. The plurality of attributes is utilized to generate a similarity vector that represents a similarity between two documents. A similarity value is then determined from the similarity vector.

In some embodiments, the plurality of attributes comprises a citation attribute, a text-based attribute, and one or more additional attributes. The citation attribute considers how two cases are related by citations between each other as well as with respect to other documents in the document corpus, and the text-based attribute is based on text mining such that it reveals common terms that are shared between the two documents of the document pair.

In many cases, authors of documents include references to other documents in the form of citations (e.g., an acknowledgement to another document, a reference to a legal authority, and the like). Citations therefore link documents together to form a citation network within the document corpus. The more two documents are linked by citations the more likely it is that the two documents are closely related and similar to one another.

Figure 5A:
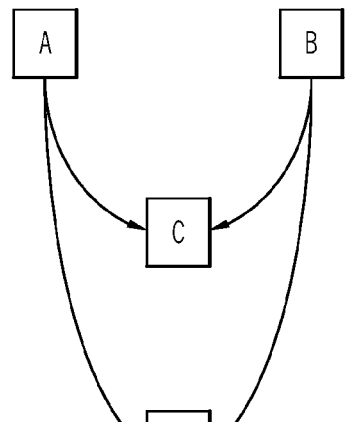
FIGS. 5A-5C depict graphical representations of co-citation, bibliographic coupling, and direct citation, respectively.
Figure 5B:
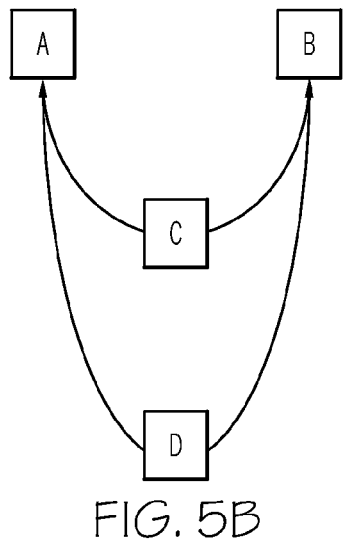
Figure 5C:
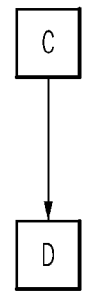

Referring now to FIGS. 5A-5C, various forms of citations are graphically illustrated (i.e., citation types). FIG. 5A illustrates co-citation, FIG. 5B illustrates bibliographic coupling, and FIG. 5C illustrates direct citation. Referring initially to FIG. 5A, two documents are citationally linked by co-citation when two documents are cited in the same document. In the illustrated example, documents C and D are cited by both document A and document B. It is noted that co-citation between documents C and D would still exist if both documents were cited by only document A or document B. Co-citation provides some indication as to the similarity between two documents.

Bibliographic coupling between two documents occurs when two documents cite the same documents. In the example depicted in FIG. 5B, documents C and D both cite documents A and B. Therefore, bibliographic coupling exists between document C and D. It is noted that bibliographic coupling between documents C and D would still exist if documents C and D cited only document A or document B. Like co-citation, bibliographic coupling provides some indication as to the similarity between two documents.

Finally, direct citation occurs when one of the documents of a document pair cites the other document. As shown in FIG. 5C, direct citation exists between documents C and D because document C cites document D. Direct citation also provides some indication as to the similarity between two documents.

Calculation of the citation attribute using co-citation, bibliographic coupling and direct citation may be performed in any number of ways. In one non-limiting example, each type of citation between two documents is assigned a similarity measure, e.g., a co-citation measure, a bibliographic coupling measure, and a direct citation measure. These similarity measures may be summed to arrive at a single value for the citation attribute. Any known or yet-to-be developed methods for calculating a co-citation similarity measure, a co-citation similarity measure and a direct citation similarity measure may be used.

In some embodiments, the citation types are weighted. It may be the case that direct citation provides a stronger indication of similarity between documents than co-citation, which provides a stronger indication of similarity between documents than bibliographic coupling. Weights may be applied when calculating the citation attribute such that: direct citation>co-citation>bibliographic coupling. Other weighting schemes may also be utilized, for instance taking the number of citations within a document into account. Further, no weighting schemes may be used in some embodiments.

In some embodiments, rather than summing the values representing each type of citation, each type of citation is its own citation attribute (e.g., co-citation attribute, bibliographic coupling attribute, and direct citation attribute). In this manner, three citation attributes will be included in the similarity vector. These citation attributes may be weighted or unweighted, as described above.

The text-based attribute represents a similarity between two documents based on shared keywords that are present within both documents. Text mining techniques may be utilized to extract keywords and then generate a similarity measure with respect to a text-based attribute that provides an indication as to the similarity between two documents. Any known or yet-to-be-developed text mining and ranking techniques may be used to generate the text-based attribute similarity measure. As an example and not a limitation, the Okapi BM25 algorithm may be used to generate a similarity measure with respect to the text-based attribute. It should be understood that embodiments are not limited to the Okapi BM25 algorithm, and that other methods may be used.

In some embodiments, one or more thesauri are utilized when calculating the text-based attribute. Thesauri (or other controlled vocabularies, such as indexes) conceptually organize terms by meaning. Accordingly, synonyms for keywords extracted from the pair of documents may also be compared between the documents when calculating the text-based attribute. More specifically, in some embodiments, a thesaurus is accessed to determine synonyms for extracted keywords. The thesaurus is organized by concepts such that semantically similar words/phrases (i.e., synonyms) appear in association with a concept ID. After the synonyms of the extracted keywords are determined, keywords and their synonyms are assigned concept IDs. Example methods of determining concept IDs from documents are described in U.S. patent application Ser. No. 12/294,589, which is hereby incorporated by reference in its entirety. The concepts IDs are totaled and used to determine similarity between documents. Documents sharing concepts IDs may be considered more similar than documents that do not share concept IDs. Any ranking function may be used to determine a similarity value with respect to concept IDs extracted from the thesaurus, such as the Okapi BM25 algorithm. In some embodiments, the thesaurus is used in conjunction with the text-based attribute such that that the text-based attribute considers both keywords and concept IDs extracted from the thesaurus. In other embodiments, a distinct text-based attribute and a distinct thesaurus attribute are determined.

In still other embodiments, the text-based attribute may also consider document tags that are generated by a natural language processing routine or are manually determined. One or more natural language processing routines may tag noun phrases (e.g., sequences of adverbs, adjectives, and nouns) as a single keyword. For example, the phrase "thin film epitaxial" may be tagged as a single keyword. If these tagged keywords are found in the thesaurus, they may then be used to calculate the similarity measure for the text-based attribute as described above. Further, embodiments may also consider these tagged keywords when accessing one or more thesauri to calculate the text-based attribute.

Embodiments of the present disclosure may also include other attributes in the plurality of attributes used to calculate the similarity vector. The plurality of attributes may include one or more of the following non-limiting examples: an author attribute, a publication attribute, an institution attribute, a downloads attribute, and a clustering results attribute. Each of these additional attributes will now be described in turn.

The author attribute provides a consideration for authorship overlap in determining the similarity vector. The same authorship between two documents may be a strong indicator of similarity between documents. It may be expected that a particular author may publish works in a particular field of study, and such published documents may discuss similar topics. In one example, the similarity measure for the author attribute may be expressed as:

$$s(p, q) = \frac{\text{number of common authors}}{\text{number of distinct authors}}, \quad \text{Eq. (1),}$$

wherein s(p,q) is a similarity measure with respect to the author attribute, p is a first electronic document (e.g., a target document being compared) and q is a second electronic document (e.g., a document in the corpus to which the first document p is compared). As indicated in Equation (1), the exemplary method of the author attribute similarity measure calculation divides the number of common authors between two documents by the number of distinct authors between the two documents.

Documents appearing in the same publication title may also have a degree of similarity, particularly in publications relating to a particular subject. As an example and not a limitation, two articles that appear in a radiology journal may both discuss radiology topics and therefore have a similarity between them. The similarity measure for the publication attribute may be set such that when two documents of a document pair are published in the same publication title (either in the same volume or issue or in separate volumes or issues), it has a higher value than when two documents are not published in the same publication title.

Similar to the publication attribute, documents published or otherwise associated with the same institution (e.g., university, corporation, non-profit organization, etc.) may have a degree of similarity. The similarity measure for the institution attribute may be set such that when two documents of a document pair are published in association with the same institution it has a higher value than when two documents are not published in the same publication title. As an example and not a limitation, this institution attribute similarity measure may be calculated by dividing the number of common institutions between two documents by the number of distinct institutions between the two documents, as provided in Equation (2):

$$s(p, q) = \frac{\text{number of common institutions}}{\text{number of distinct institutions}}, \quad \text{Eq. (2),}$$

The download attribute utilizes information regarding the downloading of documents. Information regarding a download of a document may be stored for later use and analysis. When a document, such as a journal article, is downloaded, information such as the name of a registered user who downloaded the journal article (or an anonymous indicator of the user), the IP address of the user who downloaded the journal article, the location of the user who downloaded the journal article, and the date and time that the journal article was downloaded may be aggregated and stored. Metrics using this download information may be developed and utilized to provide an indication of how similar two documents are to one another. In one non-limiting example, the similarity measure for the download attribute may be calculated as:

$$s(p, q) = \frac{\text{number of downloads of two documents in same time period}}{\text{total number of downloads of two documents}}, \quad \text{Eq. (3),}$$

wherein s(p,q) is a similarity measure with respect to the download attribute. Equation (3) is based on the premise that articles downloaded within the same time period may share similar subject matter. For example, a user researching a particular topic may download a first journal article and then a second related journal article in the same research session. The similarity measure for the download attribute may also consider downloads in the same time period by the same user. Other metrics considering the downloading of documents are also possible, and embodiments are not limited to Equation (3).

The clustering results attribute considers data regarding previous clustering results for documents in the document corpus. For example, one or more clustering algorithms may have previously been executed on the document corpus. The data for such clustering sessions may be stored (e.g., in metadata associated with the documents) and accessible. This clustering data may be accessed to generate a similarity measure with respect to previous clustering results. When calculating the similarity measure for the clustering results attribute, the clustering data for the two documents of the document pair may be compared. The metric may be configured such that overlapping clusters between the two documents produce a higher similarity measure with respect to the clustering results attribute. As an example and not a limitation, the similarity measure for the clustering results attribute may be expressed as:

$$s(p, q) = \frac{\text{number of common clusters}}{\text{total number of clusters}}, \quad \text{Eq. (4),}$$

wherein s(p,q) is a similarity measure with respect to the clustering results attribute.

The similarity vector for each document pair is calculated from the above-described attributes, and represents a similarity between the two documents of a document pair. The similarity vector includes any plurality of the above-described attributes. In some embodiments, the similarity vector includes at least the citation attribute and the text-based attribute. The similarity vector for a document pair may be expressed as:

$$\overline{S}(p, q) = \begin{pmatrix} s(p, q)_1 \\ \vdots \\ s(p, q)_n \end{pmatrix}, \quad \text{Eq. (5),}$$

wherein $\overline{S}(p,q)$ is the similarity vector for the document pair, and $s(p,q)_1 \ldots s(p,q)_n$ are the similarity measures for 1 through n number of attributes (e.g., the citation attribute, the text-based attribute, the author attribute, and the like).

From the similarity vector $\overline{S}(p,q)$ a similarity value S(p,q) may be calculated. The similarity value S(p,q) may be utilized to perform the reclassification and clustering functionality described in detail below, as well as other functionality not described herein. Generally, the similarity value S(p,q) takes into consideration all or some of the attributes present in the similarity vector. The similarity value S(p,q) may be a summation (a weighted summation in some embodiments) of the similarity measures for the respective attributes of the similarity vector. In some embodiments, the similarity value S(p,q) for a document pair may be calculated by:

$$S(p,q) = \Sigma_i w_i s(p,q)_i \quad \text{Eq. (6),}$$

wherein $w_i$ is a weighting factor for each attribute i of the plurality of attributes associated with the similarity vector. The weighting factor $w_i$ for each attribute may be set based on the importance of the particular attribute in determining similarity between two documents. An attribute having a greater influence on similarity between documents may have a greater weighting factor w than an attribute having a lesser influence on similarity between documents. As an example and not a limitation, the citation attribute may have a greater weighting factor w than the downloads attribute in some embodiments.

Thus, each attribute (or a sub-set of attributes) contribute to the similarity value. The similarity value indicates a degree of similarity between a pair of documents comprising a first document p (a document under evaluation) and a second document q (a compared document) The second document q having the highest similarity value with respect to a first document p is the document that is most similar to the first document p. Embodiments of the present disclosure use the predetermined classification codes described above as a training set to reclassify documents into more appropriate classification codes based on the subject matter of the documents. More specifically, embodiments employ a classifier using the predetermined classification codes and the similarity values described above to determine whether or not a document should be reclassified (see block 112 of the flowchart depicted in FIG. 4). The classifier may be an instance-based learning algorithm that uses the predetermined classification codes as a training set. In one embodiment, the classifier is a k-nearest neighbor classifier. It should be understood that, although embodiments are described herein in the context of the k-nearest neighbor classifier, other known and yet-to-be-developed instance-based learning algorithms may be used.

The k-nearest algorithm finds the k number of documents that are closest to a document that is under evaluation (i.e., the first document p in the equations provided above with respect to the similarity vector and value). In the illustrated embodiment k is equal to ten. It should be understood that other values for k may be utilized. The k-value may be determined empirically in some embodiments.

Generally, the k-nearest neighbor classifier determines the ten documents in the corpus that have the highest similarity value with respect to the target document (i.e., the document under evaluation).

The predetermined classification codes assigned to the k-most similar documents may be evaluated and used to determine an evaluation classification code for the target document in some embodiments. The k-nearest neighbor classifier is a voting system of neighbors wherein the evaluation classification code is equal to the greatest number of instances of a predetermined classification code of the k-nearest neighbors. The evaluation classification code is then stored or otherwise associated with the target document at block 114 of the flowchart depicted in FIG. 4 (e.g., stored in metadata).

As an example and not a limitation, if classification code "A1" is assigned to nine of the ten most similar documents to a target document, and classification code "A2" is assigned to one of the ten most similar documents, then the evaluation classification code for the target document would be set to "A1." It is noted that, in some embodiments, k is equal to an odd number to prevent ties from occurring.

In some cases, the predetermined classification code assigned to the target document will be the same as the evaluation classification code that is determined by the instance-based classifier. In other cases, the predetermined classification code may be different from the evaluation classification code. Documents wherein the predetermined classification code is different from the evaluation classification code are reclassified in accordance with the evaluation classification code.

Using the above example, the predetermined classification code of the target document may be "A2" but the evaluation classification code may be "A1." In this case, the evaluation classification code of the target document is different from the predetermined classification code. Therefore, this particular target document will be reclassified from classification code "A2" to classification code "A1." There are many reasons why this discrepancy may occur. For example, a journal article may be published in a journal having a particular classification code, but the journal article may be more similar to the subject matter of journal articles associated with a different classification code.

Other methods of determining evaluation classification codes using the similarity values are also possible. For example, embodiments may consider the similarity values between a document under evaluation and the most similar document, not just the predetermined classification code (and/or evaluation classification code, in some embodiments) as described above. More specifically, the k-nearest documents to the document under evaluation are determined as described above. Next, the similarity values with respect to the k-nearest documents are summed by predetermined classification code (and/or evaluation classification code, in some embodiments). The classification code having the highest sum is selected as the evaluation classification code for the document under evaluation. Table 1 provides a non-limiting example of determining the evaluation code using similarity values.

TABLE 1

| | Document ID q | Classification Code | Similarity Value with Respect to Document Under Evaluation |
|---|---|---|---|
| 1 | 32478643 | A1 | 75.5 |
| 2 | 45790757 | A1 | 62.9 |
| 3 | 34580993 | A2 | 86.7 |
| 4 | 45689523 | A2 | 80.3 |
| 5 | 00234678 | A1 | 65.0 |
| 6 | 02346734 | A4 | 78.4 |
| 7 | 12836934 | A1 | 56.9 |
| 8 | 23496304 | A2 | 91.7 |
| 9 | 34537456 | A1 | 63.6 |
| 10 | 24578456 | A2 | 79.7 |

Table 1 lists the ten most similar documents with respect to the document under evaluation. In this example k=10. However, it should be understood that other values for k may be used. Three classification codes are represented by the ten most similar documents: A1 (five documents), A2 (four documents) and A4 (one document). The similarity values of the documents having each classification code are summed. It should be understood that the values listed in Table 1 are for illustrative purposes only. In this example, the summed similarity values of documents associated with classification code A1 equals 323.9, the summed similarity values of documents associated with classification code A2 equals 338.4, and A4 equals 78.4. Although there are more documents associated with classification code A1, classification code A2 has a higher summation value of the similarity values and is therefore chosen as the evaluation classification code for the document under evaluation.

In still other embodiments, the average similarity value of the documents associated with each classification code is utilized rather than the summation. In the example provided in Table 1, the average similarity value is as follows: A1→64.78; A2→84.6; and A4→78.4. In this example classification code A2 would also be chosen for the evaluation classification code of the document under consideration.

Each document in the document corpus, or a sub-set of documents in the document corpus, is evaluated by the classifier and is reclassified if the evaluation classification code is different from the predetermined classification code. In some embodiments, the classifier is applied to documents of the document corpus in a first pass wherein the predetermined classification codes of the documents are used to determine the evaluation classification codes. In a second pass, the evaluation classification codes determined in the first pass are used as the training set to update the classification status of each document based on the evaluation classification codes (see arrow 119 in FIG. 4). In other embodiments, one pass is performed wherein the classifier preferentially chooses an evaluation classification code over the predetermined classification code if an evaluation classification code is associated with the document being compared to the target document. In yet other embodiments, one pass is performed wherein only the predetermined classification codes are used by the classifier.

Accordingly, embodiments use the predetermined classification codes as a training set for a classifier to appropriately classify documents based on document similarity.

In some embodiments, documents within each classification code are grouped into hierarchical clusters following the reclassification process described above (see blocks 116 and 118 of the flowchart depicted in FIG. 4). Clusters are groups of similar documents based on the similarity value or some other metric. Generally, a clustering algorithm is applied to the documents of individual classification codes to form a plurality of hierarchical clusters. The clustering algorithm may be any known or yet-to-be-developed unsupervised, hierarchical clustering algorithm. For example, the clustering algorithm may be an agglomerative clustering algorithm or a divisive clustering algorithm.

Figure 6:
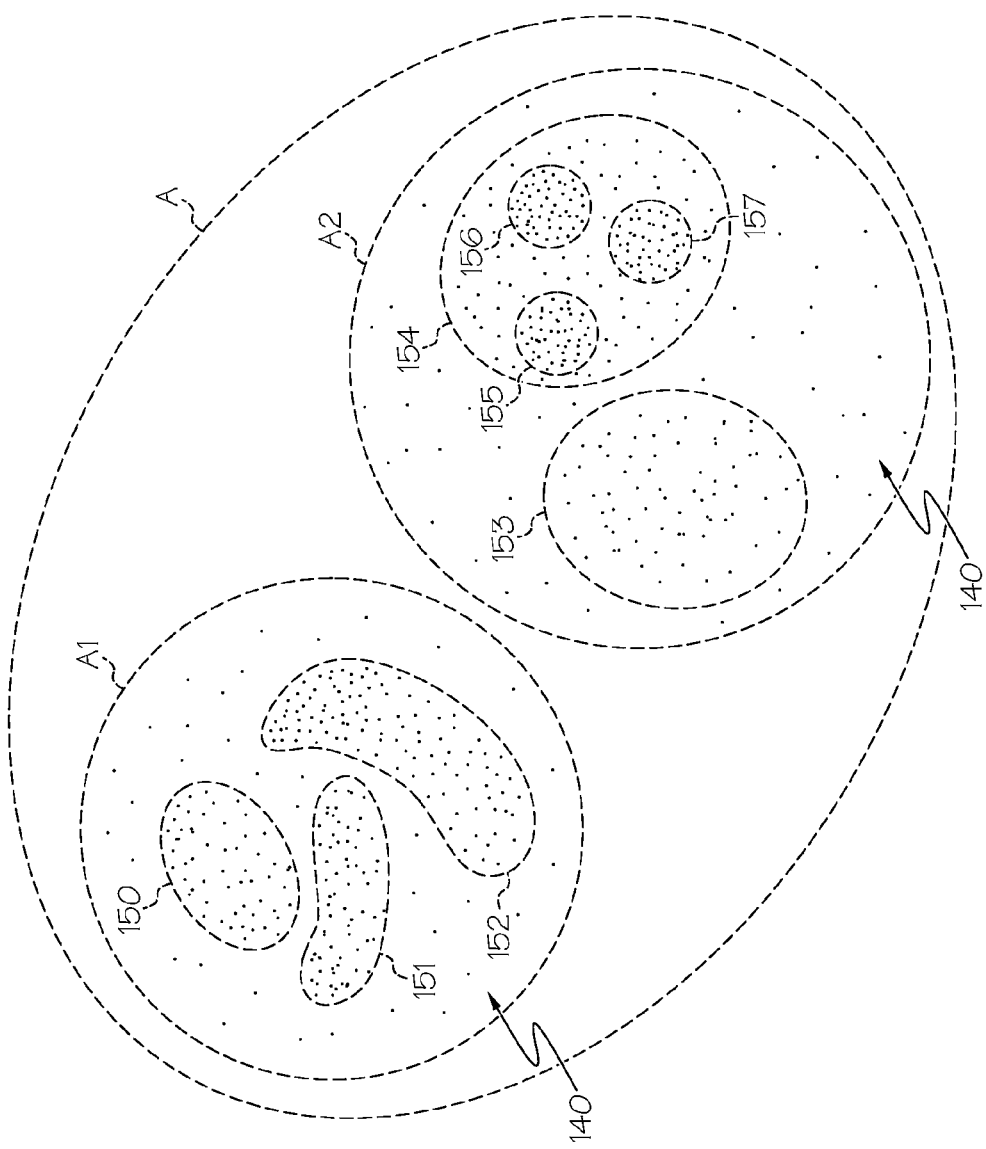
FIG. 6 depicts a graphical representation of clusters of documents associated with different classification codes of a classification system according to one or more embodiments described and illustrated herein.

FIG. 6 depicts a sub-set of related documents belonging to a sample classification code A. It should be understood that embodiments are not limited to the graphical representation of FIG. 6, and that FIG. 6 is provided for illustrative purposes only. Each dot in FIG. 6 represents a document in the corpus. The documents are arranged by similarity according to the similarity/value discussed above, and related documents naturally form groups of documents. The groups of documents fall within sub-classification codes A1 and A2, which also belong to classification code A, as indicated by the dashed circular shapes.

For each lower-level classification code (e.g., each lower-level classification code (e.g., A1, A2 . . . ), a cluster algorithm is applied to identify a plurality of clusters of documents 140 within that particular classification code. As stated above, the clustering algorithm is a hierarchical clustering algorithm that defines hierarchical clusters of documents 140. Each level in the hierarchy has a metric to determine whether or not a document should be included in the cluster. In some embodiments, the metric is a distance between pairs of documents. Generally, the lower the level in the hierarchy, the shorter the required distance for a document to be included in the cluster. Documents in lower-level clusters are also associated with higher-level clusters from which the lower-level clusters stem.

In the example depicted in FIG. 6, three clusters 150, 151, 152 in one level are found by the clustering algorithm in the A1 classification code. Regarding classification code A2, two clusters 153, 154 are identified, while three clusters 155, 156, 157 are found under cluster 154. It should be understood that any number of levels of clusters may be formed, and further, any number of clusters may be formed. It is noted that not every document needs to be assigned to a lowest-level cluster. As shown in FIG. 6, there are documents that fall in cluster 154 that do not fall in lower-level clusters 155, 156, and 157.

In some embodiments, the documents in each classification code are organized into clusters. In other embodiments, only the documents in the sub-classification codes (see FIG. 3, e.g., classification codes A1, A2, A3, etc.) are organized into clusters.

Referring now to FIG. 7, a graphical representation of a portion of a classification system 100' is illustrated. More specifically, a single classification code A of the classification system 100' with sub-classifications and hierarchical clusters is illustrated. As shown in FIG. 7, a clustering algorithm has identified a plurality of hierarchical clusters 140 within classification code A1. In the illustrated example, three levels of clusters have been defined: a first level 141, a second level 142, and a third level 143, with the third level 143 having the most closely related documents (i.e., the shortest distance requirement between pairs of documents). It should be understood that clusters may be identified under each lowest-level classifications or some portion of the lowest-level classification codes of the classification system.

Accordingly, as shown in FIG. 7, the highest levels of the classification system are established classification codes to which documents are assigned (e.g., A→A1, A2, A3 . . . , B→B1, B2, B3 . . . ). The lower-levels of the classification system are clusters 140 that are formed by unsupervised clustering. It is noted that one document may be allowed to be present in multiple clusters. New clusters may be created, or clusters may be merged over time as new documents are added to the document corpus. In some embodiments, cluster membership is permanent, and documents do not get removed from clusters unless there is a split or merger of clusters. Finely-tuned clusters allow groups of highly related documents to be identified, and may allow researchers to more quickly and easily identify documents relevant to their field of interest.

In some embodiments, sample keywords are extracted from the documents of each cluster and stored. These sample keywords act as a fingerprint of the cluster, and therefore provide an indication as to the subject matter of the documents in the cluster.

It should be understood that embodiments described herein provide for systems, methods, and computer-program products for generating similarity vectors and values for document pairs using a plurality of attributes, such as a citation attribute and a text-based attribute. Embodiments described herein also provide for reclassification of documents assigned a predetermined classification code, as well as for the formation of hierarchical clusters of documents under the classification codes of a classification system. Embodiments may therefore more accurately classify documents and also provide for narrowly defined groups of documents that allow researchers to more quickly and easily identify relevant documents.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A computer-based method of reclassifying and clustering electronic documents of a document corpus to improve classification of the electronic documents so that correct documents are returned as a result of a computer-based search, the method comprising:
    comparing, by a computer, each individual electronic document in the document corpus with each other electronic document in the document corpus, thereby forming document pairs, wherein the electronic documents of the document pairs are compared by:
        calculating a similarity value with respect to the electronic documents of a document pair from a plurality of attributes of the electronic documents in the document corpus, the plurality of attributes comprising a citation attribute, a text-based attribute, and one or more of the following attributes:
an author attribute expressed as $$s(p, q) = \frac{\text{number of common authors}}{\text{number of distinct authors}},$$

a publication attribute,
an institution attribute expressed as $$s(p, q) = \frac{\text{number of common institutions}}{\text{number of distinct institutions}},$$

a downloads attribute expressed as $$s(p, q) = \frac{\text{number of downloads of two documents in a same time period}}{\text{total number of downloads of two documents}}, \text{ and}$$

a clustering results attribute expressed as $$s(p, q) = \frac{\text{number of common clusters}}{\text{total number of clusters}},$$

wherein the calculating comprises:
calculating a similarity vector $\overline{S}(p,q)$ for each document pair in the document corpus, wherein the similarity vector $\overline{S}(p,q)$ is expressed by:

$$\overline{S}(p, q) = \begin{pmatrix} s(p, q)_1 \\ \vdots \\ s(p, q)_n \end{pmatrix},$$

where s(p,q) is a similarity measure of a first electronic document p to a second electronic document q of the document pair with respect to an individual attribute of the plurality of attributes; and
calculating the similarity value for each document pair comprises summing weighted individual similarity measures of the similarity vector $\overline{S}(p,q)$ such that the similarity value is expressed by:

$$S(p, q) = \sum_i w_i s(p, q)_i$$

where $w_i$ is a weighting factor for each attribute i of the plurality of attributes; and
associating the similarity value with both electronic documents of the document pair;
generating a plurality of hierarchical clusters by applying a clustering algorithm to the document corpus using the similarity values;
organizing documents into the plurality of hierarchical clusters by saving metadata associated with each individual electronic document in the document corpus and each of the plurality of hierarchical clusters to which each individual electronic document in the document corpus has been assigned such that each individual electronic document is reclassified in a new classification according to the hierarchical cluster; and
providing the documents in the plurality of hierarchical clusters such that, when the computer-based search is completed, the computer-based search searches the document corpus and the results are derived from the saved metadata and are graphically presented at a user computing device as a plurality of dots, each dot in the plurality of dots corresponding to each electronic document of the document corpus, the plurality of dots arranged according to the plurality of hierarchical clusters.

2. The computer-based method of claim 1, wherein the citation attribute is based on citations between the electronic documents of the document pair and/or between the other electronic documents in the document corpus, and the text-based attribute is based on keywords extracted from the electronic documents of the document corpus.

3. The computer-based method of claim 1, wherein calculating the similarity value comprises generating a keyword vector for each electronic document in the document corpus from keywords extracted from the electronic documents of the document corpus.

4. The computer-based method of claim 3, further comprising extracting, from at least one thesaurus, one or more synonyms of one or more keywords extracted from the electronic documents of the document corpus, wherein the text-based attribute is further based on the synonyms.

5. The computer-based method of claim 1, wherein the citation attribute is based on one or more of direct citations, co-citations and bibliographic couplings.

6. The computer-based method of claim 5, wherein different weights are assigned to the one or more of the direct citations, co-citations and bibliographic couplings in calculating the similarity value.

7. The computer-based method of claim 1, wherein:
the citation attribute is based on direct citations, co-citations, and bibliographic couplings;
a weight associated with the direct citations is greater than a weight associated with the co-citations; and
the weight associated with the co-citations is greater than a weight associated with the bibliographic couplings.

8. The computer-based method of claim 1, further comprising extracting sample keywords from electronic documents within each cluster of the plurality of hierarchical clusters, and associating the sample keywords with each cluster.

9. A method of improving computer-based search results by organizing electronic documents of a document corpus, each one of the electronic documents comprising a predetermined classification code and having similarity values based on a similarity with respect to other electronic documents in the document corpus, the method comprising:
comparing each individual electronic document in the document corpus with each other electronic document in the document corpus, thereby forming document pairs, wherein the electronic documents of the document pairs are compared by:
calculating a similarity value with respect to the electronic documents of a document pair from a plurality of attributes of the electronic documents in the document corpus, the plurality of attributes comprising a citation attribute, a text-based attribute, and one or more of the following attributes:
an author attribute expressed as $$s(p,q) = \frac{\text{number of common authors}}{\text{number of distinct authors}},$$

a publication attribute,
an institution attribute expressed as $$s(p,q) = \frac{\text{number of common institutions}}{\text{number of distinct institutions}},$$

a downloads attribute expressed as $$s(p,q) = \frac{\text{number of downloads of two documents in a same time period}}{\text{total number of downloads of two documents}}, \text{ and}$$

a clustering results attribute expressed as $$s(p,q) = \frac{\text{number of common clusters}}{\text{total number of clusters}},$$

wherein the calculating comprises:
calculating a similarity vector $\bar{S}(p,q)$ for each document pair in the document corpus, wherein the similarity vector $\bar{S}(p,q)$ is expressed by:

$$\bar{S}(p,q) = \begin{pmatrix} s(p,q)_1 \\ \vdots \\ s(p,q)_n \end{pmatrix},$$

where $s(p,q)$ is a similarity measure of a first electronic document p to a second electronic document q of the document pair with respect to an individual attribute of the plurality of attributes; and
calculating the similarity value for each document pair comprises summing weighted individual similarity measures of the similarity vector $\bar{S}(p,q)$ such that the similarity value is expressed by:

$$S(p,q) = \sum_i w_i s(p,q)_i$$

where $w_i$ is a weighting factor for each attribute i of the plurality of attributes; and
associating the similarity value with both electronic documents of the document pair;
for one or more predetermined classification codes:
applying a classifier to each electronic document having the predetermined classification code to associate an evaluation code with each electronic document, wherein the classifier uses the similarity values of the electronic documents having the predetermined classification code;
for one or more predetermined classification codes, after determining an evaluation classification for each electronic document in the document corpus:
applying a clustering algorithm to electronic documents having an evaluation code that is the same as the predetermined classification code to create a plurality of hierarchical clusters under the predetermined classification code, wherein the clustering algorithm uses the similarity values of the electronic documents in the document corpus to save metadata associated with each individual electronic document in the document corpus; and
providing the electronic documents in the plurality of hierarchical clusters such that, when a computer-based search is completed, the computer-based search searches the document corpus and the results are derived from the saved metadata and are graphically presented at a user computing device as a plurality of dots, each dot in the plurality of dots corresponding to each electronic document of the document corpus, the plurality of dots arranged according to the plurality of hierarchical clusters.

10. The method of claim 9, wherein the citation attribute is based on direct citations, co-citations and bibliographic couplings.

11. The method of claim 9, wherein a weight associated with direct citations is greater than a weight associated with co-citation, and the weight associated with co-citation is greater than a weight associated with bibliographic coupling.

12. The method of claim 11, further comprising extracting, from at least one thesaurus, one or more synonyms of one or more keywords extracted from the electronic documents of the document corpus, wherein the text-based attribute is further based on the synonyms.

13. The method of claim 9, wherein the plurality of attributes further includes one or more of the following: an author attribute, a publication attribute, an institution attribute, a downloads attribute, and a clustering results attribute.

14. The method of claim 9, wherein the classifier is a k-nearest neighbor classifier, and the electronic documents in the predetermined classification code represent a training set.

15. The method of claim 9, wherein an electronic document is reclassified to the evaluation classification code if the evaluation classification code is different from the predetermined classification code originally associated with the electronic document.

16. A computer-program product for clustering electronic documents of a document corpus to improve classification of the electronic documents so that correct documents are returned as a result of a computer-based search, the computer-program product comprising a non-transitory computer-readable medium storing executable instructions that, when executed by a computing device, cause the computing device to:
compare each individual electronic document in the document corpus with each other electronic document in the document corpus, thereby forming document pairs, wherein the electronic documents of the document pairs are compared by:
calculating a similarity value with respect to the electronic documents of a document pair from a plurality of attributes of the electronic documents in the document corpus, the plurality of attributes comprising a citation attribute, a text-based attribute and one or more of the following attributes:
an author attribute expressed as $$s(p, q) = \frac{\text{number of common authors}}{\text{number of distinct authors}},$$

a publication attribute,
an institution attribute expressed as $$s(p, q) = \frac{\text{number of common institutions}}{\text{number of distinct institutions}},$$

a downloads attribute expressed as $$s(p, q) = \frac{\text{number of downloads of two documents in a same time period}}{\text{total number of downloads of two documents}}, \text{ and}$$

a clustering results attribute expressed as $$s(p, q) = \frac{\text{number of common clusters}}{\text{total number of clusters}},$$

wherein the calculating comprises:
 calculating a similarity vector $\overline{S}(p,q)$ for each document pair in the document corpus, wherein the similarity vector $\overline{S}(p,q)$ is expressed by:

$$\overline{S}(p, q) = \begin{pmatrix} s(p, q)_1 \\ \vdots \\ s(p, q)_n \end{pmatrix},$$

where s(p,q) is a similarity measure of a first electronic document p to a second electronic document q of the document pair with respect to an individual attribute of the plurality of attributes; and calculating the similarity value for each document pair comprises summing weighted individual similarity measures of the similarity vector $\overline{S}(p,q)$ such that the similarity value is expressed by:

$$S(p, q) = \sum_i w_i s(p, q)_i$$

where $w_i$ is a weighting factor for each attribute i of the plurality of attributes; and
associating the similarity value with both electronic documents of the document pair;
generate a plurality of hierarchical clusters by applying a clustering algorithm to the document corpus using the similarity values;
organize documents into the plurality of hierarchical clusters by saving metadata associated with each individual electronic document in the document corpus and each of the plurality of hierarchical clusters to which each individual electronic document in the document corpus has been assigned such that each individual electronic document is reclassified in a new classification according to the hierarchical cluster; and
provide the documents in the plurality of hierarchical clusters such that, when the computer-based search is completed, the computer-based search searches the document corpus and the results are derived from the saved metadata and are graphically presented at a user computing device as a plurality of dots, each dot in the plurality of dots corresponding to each electronic document of the document corpus, the plurality of dots arranged according to the plurality of hierarchical clusters.

* * * * *